Patented Oct. 17, 1922.

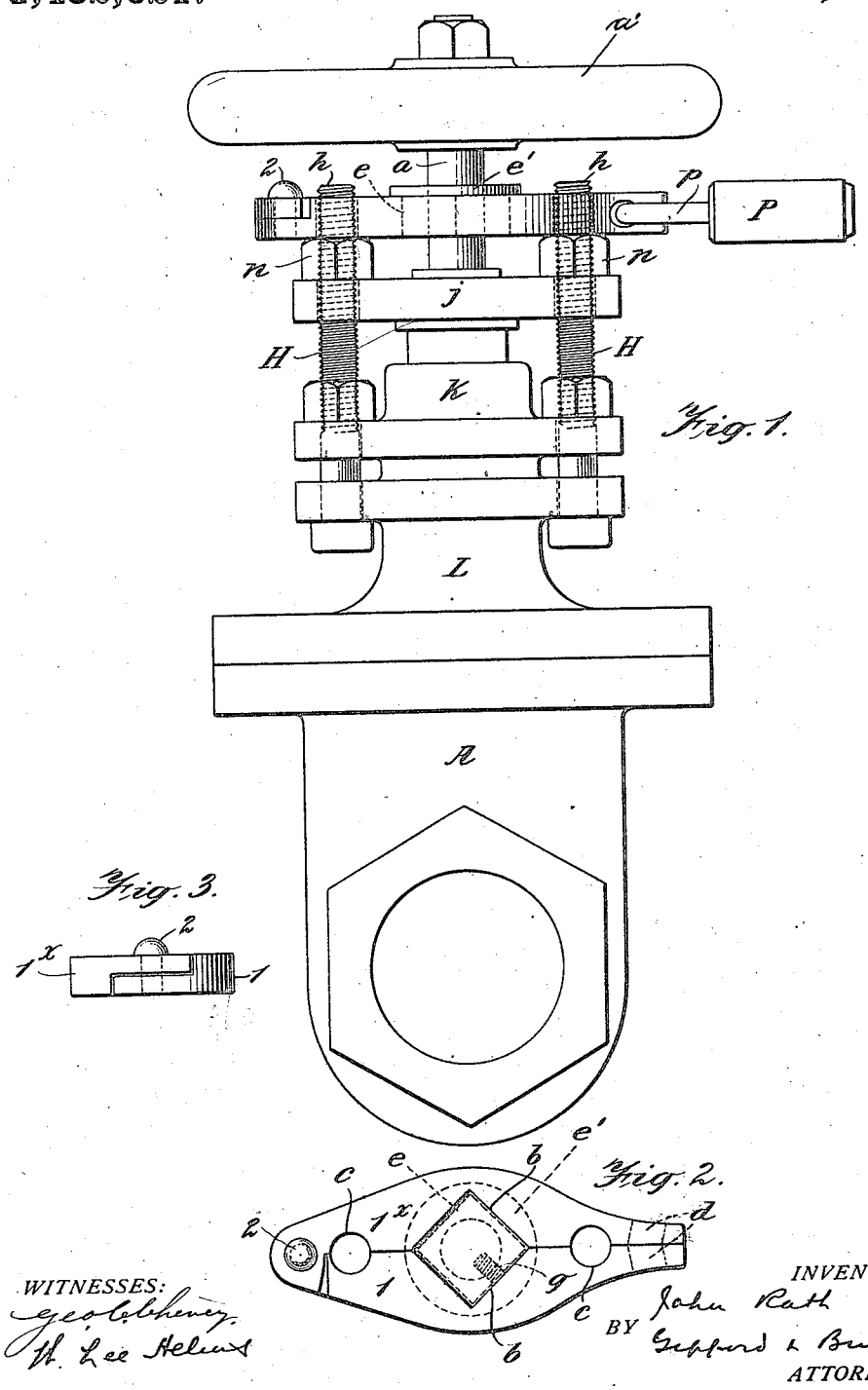

1,432,621

UNITED STATES PATENT OFFICE.

JOHN RATH, OF BAYONNE, NEW JERSEY.

SPINDLE LOCK.

Application filed September 26, 1917. Serial No. 193,219.

*To all whom it may concern:*

Be it known that I, JOHN RATH, a citizen of the United States, residing at Bayonne, county of Hudson, and State of New Jersey, have invented certain new and useful Improvements in Spindle Locks, of which the following is a specification.

This invention relates to improvements in spindle locks, and has for its object to provide a simple, strong and efficient means for preventing the rotation of a spindle. The lock comprises a yoke having a pair of pivotally connected parts, the inner face of each part being shaped to conform to and cooperate with contact faces rigid with the spindle. The yoke-parts when in position to embrace the spindle are held in closed position by any suitable locking means, such as a padlock, and means are provided both for preventing the rotation of the yoke with the spindle and for holding the yoke against movement lengthwise of the spindle.

In the drawings, Figure 1 is a front elevation of the improvements applied to the spindle of a gate valve.

Fig. 2 is a plan view of the locking yoke, dotted lines indicating its relation to the spindle.

Fig. 3 is a rear end view of the same.

The present embodiment of the improvements is adapted for locking the spindle $a$ of a gate valve A. The spindle is provided with an operating member or hand wheel $a'$ by means of which it is rotated. The locking means comprises a yoke formed of two parts 1 and $1^x$, pivotally connected at one end by means of the hinge pin 2. Each one of the yoke-parts is shaped at its inner face to form a large V-shaped recess $b$, and furthermore each part is shaped to form two semi-circular recesses $c$. The end of each yoke-part opposite hinge pin 2 is provided with the transverse aperture $d$.

The recesses formed in the one yoke part come into register with the corresponding recesses formed in the second yoke-part, so that when the yoke is closed a central rectangular opening intermediate two circular openings is provided in the yoke.

When the yoke is closed in position on the spindle the central rectangular opening receives the angular, here shown rectangular locking member $e$ which is rigidly held upon the spindle $a$ by means of a set screw $g$ as indicated in Fig. 2. Each circular opening of the yoke receives the upper extension $h$ of a stationary bolt H, or casing member the latter having the function of holding the packing-gland members J and K rigidly upon valve cap L. The nuts $n$ on bolts H serve as a base support for the yoke.

The rectangular locking member $e$ is formed with an upper flange $e'$ which overhangs the yoke when the latter is in locking position. The nuts $n$ and the flange $e'$ thus hold the yoke against movement lengthwise of the spindle.

The end of the yoke opposite hinge pin 2 may be provided with any form of lock. In the present embodiment of the invention the apertures $d$ formed in the yoke members receive the staple $p$ of a padlock P. It will be seen that the unlocking of the end of the yoke will permit its parts to swing on hinge pin 2 and thus out of engagement with the rectangular contact member $e$ and the flange thereof, as well as the bolt projections $h$, so that the yoke as a whole may be withdrawn from the spindle, and that when the sections of the yoke are closed, the yoke is locked both to the spindle and to the support for the spindle. It will also be understood that any suitable means may be provided, other than the nuts $n$ or flange $e'$ for holding the yoke against endwise movement relatively to the spindle, and that the device may be applied to any type of spindle.

What I claim and desire to secure by Letters Patent of the United States, is:—

1. The combination with a valve having a casing, a spindle and means for turning the spindle to open and close the valve, of a locking block rigidly secured to the spindle, a member adjacent to the spindle rigidly fixed to the casing, and a multi-part yoke adapted when closed to engage the locking block and the member to hold the spindle against rotation, said locking block and said member being arranged to cooperate in holding the yoke against longitudinal movement on the spindle.

2. The combination with a valve having a casing, a spindle and an operating member thereon for turning the spindle to open and close the valve, of a flanged locking block rigidly secured to the spindle, a member rigidly affixed to the casing extending adjacent to the spindle and having an enlargement and a locking member adapted to engage both the locking block and the casing member to prevent the rotary movement of the spindle, said locking member being interposed between and held against longitudinal movement relative to the spindle by the flange of the locking block and the enlargement of the casing member.

3. The combination with a valve having a casing, a spindle and an operating member thereon for turning the spindle to open and close the valve, of a flanged locking block rigidly secured to the spindle, members on opposite sides of the spindle rigidly affixed to the casing and having enlargements, and a locking member adapted to engage both the locking block and the casing members to prevent rotary movement of the spindle, said locking member being interposed between, and held against longitudinal movement relative to the spindle by the flange of the locking block and the enlargements of the casing members.

4. The combination with a valve having a casing, a spindle and an operating member thereon for turning the spindle to open and close the valve, of a flanged locking block rigidly secured to the spindle, members on opposite sides of the spindle rigidly affixed to the casing and having enlargements, and a locking yoke comprising pair of pivotally connected members having registering recesses adapted to cooperate with both the locking block and the casing members to prevent the rotary movement of the spindle, said yoke being held against longitudinal movement relative to the spindle by the flange of the locking block and by the enlargements of the casing members.

5. The combination with a rotatable spindle, means operated thereby, and means associated with said spindle for effecting its operation, of locking means comprising a pair of pivotally connected members adapted to embrace and clamp said spindle so as to be rotatable therewith and longitudinally slidable with respect thereto, positioning means adapted to engage said locking means for preventing lengthwise movement thereof relative to the spindle, and means cooperating with said locking means for preventing rotative movements thereof and of said spindle.

6. The combination with a rotatable spindle, means operated thereby, and means associated with said spindle for effecting its operation, of removable locking means comprising cooperating clamping members adapted to embrace said spindle so as to be rotatable therewith and longitudinally slidable with respect thereto, positioning means adapted to engage opposite sides of said locking means to prevent lengthwise movements thereof in either direction relative to said spindle, and stationary means adapted to be clamped between the members of said locking means to prevent rotative movement thereof and of said spindle.

7. The combination with a casing, a rotatable spindle therein, means operated by said spindle, and means for effecting rotative movements of said spindle, of stationary means fixed to said casing and extending adjacent the spindle, removable locking means comprising pivotally connected members adapted to embrace and clamp both the spindle and said stationary means, a lock for holding the members of said locking means in clamping position and means associated with said spindle and said stationary means for preventing lengthwise movement of said locking means in either direction relative to said spindle.

In testimony whereof I have hereunto signed my name in the presence of two subscribing witnesses.

JOHN RATH.

Witnesses:
WILLIAM P. LEE,
RICHARD WALSH.